(12) United States Patent
Jeong et al.

(10) Patent No.: US 9,658,643 B2
(45) Date of Patent: May 23, 2017

(54) DATA INTERFACE AND DATA TRANSMISSION METHOD

(71) Applicant: SAMSUNG ELECTRONICS CO., LTD., Suwon-si, Gyeonggi-Do (KR)

(72) Inventors: Young-Kyun Jeong, Hwaseong-si (KR); Jung-Hoon Chun, Seoul (KR); June-Hee Lee, Yongin-si (KR); Won-Ho Choi, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 146 days.

(21) Appl. No.: 14/623,069

(22) Filed: Feb. 16, 2015

(65) Prior Publication Data

US 2016/0116936 A1 Apr. 28, 2016

(30) Foreign Application Priority Data

Oct. 24, 2014 (KR) ........................ 10-2014-0145274

(51) Int. Cl.
*G06F 1/08* (2006.01)
*G06F 13/40* (2006.01)

(52) U.S. Cl.
CPC ............ *G06F 1/08* (2013.01); *G06F 13/4068* (2013.01)

(58) Field of Classification Search
CPC .............................. G06F 13/4068; G06F 1/08
See application file for complete search history.

(56) References Cited

U.S. PATENT DOCUMENTS

| | | | |
|---|---|---|---|
| 6,288,656 B1* | 9/2001 | Desai | H04L 25/14 341/100 |
| 6,586,968 B1 | 7/2003 | Schauer et al. | |
| 6,775,248 B1 | 8/2004 | Farwell et al. | |
| 7,339,508 B2 | 3/2008 | Cosgrave et al. | |
| 7,626,624 B2 | 12/2009 | Fraenkel et al. | |
| 8,081,706 B2 | 12/2011 | Shumarayev | |
| 8,111,737 B2 | 2/2012 | Chiu | |
| 8,442,449 B2 | 5/2013 | Hui et al. | |
| 2002/0018444 A1* | 2/2002 | Cremin | H04J 3/0629 370/235 |
| 2005/0069067 A1* | 3/2005 | Zerbe | H04L 25/4917 375/353 |

(Continued)

FOREIGN PATENT DOCUMENTS

JP 2008217733 9/2008
KR 0946177 3/2010

*Primary Examiner* — Thomas Lee
*Assistant Examiner* — Chad Erdman
(74) *Attorney, Agent, or Firm* — Volentine & Whitt, PLLC

(57) ABSTRACT

A data interface includes a first sampler sampling a first bitset and a second sampler sampling a second bitset. The first bitset includes a first bit which is included in a first image data and a third bit which is included in a second image, and the second bitset includes a second bit which is included in the first image data and is a higher-order bit than the first bit and a fourth bit which is included in the second image data and is a higher-order bit than the third bit. The data interface further includes a clock generator configured to adjust a sampling timing of the first and second bitsets based on a multi-phase clock, and a clock data recovery (CDR) circuit shared by the first sampler, the second sampler and configured to output the multi-phase clock to the clock generator.

20 Claims, 11 Drawing Sheets

(56) References Cited

U.S. PATENT DOCUMENTS

| | | | |
|---|---|---|---|
| 2007/0043991 A1* | 2/2007 | Nguyen | H03M 9/00 714/731 |
| 2008/0068231 A1* | 3/2008 | Kuhns | H04N 19/426 341/51 |
| 2008/0117984 A1 | 5/2008 | Hao et al. | |
| 2009/0243681 A1* | 10/2009 | Zerbe | H04L 7/0066 327/163 |
| 2011/0157485 A1* | 6/2011 | Fairgrieve | H04N 9/312 348/744 |
| 2011/0196997 A1* | 8/2011 | Ruberg | H04L 29/10 710/71 |
| 2015/0339257 A1* | 11/2015 | Hug | H04L 5/16 710/110 |

* cited by examiner

DATA INTERFACE AND DATA TRANSMISSION METHOD

CROSS-REFERENCE TO RELATED APPLICATIONS

A claim of priority is made to Korean Patent Application No. 10-2014-0145274, filed on Oct. 24, 2014, in the Korean Intellectual Property Office, the disclosure of which is incorporated herein in its entirety by reference.

BACKGROUND

The present inventive concept relates to a data interface and to a method of transmitting data.

An image capture device includes an image sensor which may include one or more semiconductor elements that convert optical information into an electrical signal. The image sensor may transmit the electrical signal to an image data processor (ISP), and a data interface may be used in the process of transmitting the optical information.

The data interface may include a serializer-deserializer that serializes data for transmission through a transmission channel, and deserializes serialized data that is received through a transmission channel. In addition, the data interface recovers a frequency of the received data using a clock data recovery (CDR) circuit and operates a sampler circuit using a clock of the recovered frequency. In this way, a receiving end can continuously receive data from a transmitting end that operates at a different frequency from a reference clock frequency used as a basis by the receiving end. However, recent and rapid increases in the amount of data transmitted from an image sensor has resulted in a substantial increase in power consumption, which in turn can cause problems such as local image quality degradation (shading) due to heat generation, a reduction in battery life, and so on.

SUMMARY

According to an aspect of the present inventive concept, there is provided a data interface including a first sampler configured to sample a first bitset having a first bit which is included in a first image data and a third bit which is included in a second image data, a second sampler configured to sample a second bitset having a second bit which is included in the first image data and is a higher-order bit than the first bit and a fourth bit which is included in the second image data and is a higher-order bit than the third bit, a clock generator configured to adjust a sampling timing of the first and second bitsets based on a multi-phase clock, and a clock data recovery (CDR) circuit shared by the first sampler, the second sampler and configured to output the multi-phase clock to the clock generator.

According to another aspect of the present inventive concept, there is provided a data interface device including a formatter configured to generate a first bitset having a first bit which is included in a first image data and a third bit which is included in a second image data and a second bitset having a second bit which is included in the first image data and is a higher-order bit than the first bit and a fourth bit which is included in the second image data and is a higher-order bit than the third bit, a first serializer configured to serialize the first bitset, a second serializer configured to serialize the second bitset, a first output driver configured to convert the serialized first bitset into a first differential signal, a second output driver configured to convert the serialized second bitset into a second differential signal, and a clock generator configured to a plurality of clock signals to the formatter, the first and second serializers, and the first and second output drivers According to still another aspect of the present inventive concept, there is provided a data transmission method including receiving a first bitset comprising a first bit which is included in a first image data and a third bit which is included in a second image data through a first channel, receiving a second bitset comprising a second bit which is included in the first image data and is a higher-order bit than the first bit and a fourth bit which is included in the second image data and is a higher-order bit than the third bit through a second channel, sampling the first and second bitsets based on a clock input provided by a clock generator, and adjusting the sampling timing of each of the first and second bitsets by adjusting a multi-phase clock signal provided by a clock data recovery (CDR) circuit.

BRIEF DESCRIPTION OF THE DRAWINGS

The above and other aspects and features of the present inventive concept will become more apparent from the detailed description that follows herein, with reference to the attached drawings, in which.

DETAILED DESCRIPTION OF EMBODIMENTS

Figure 1:
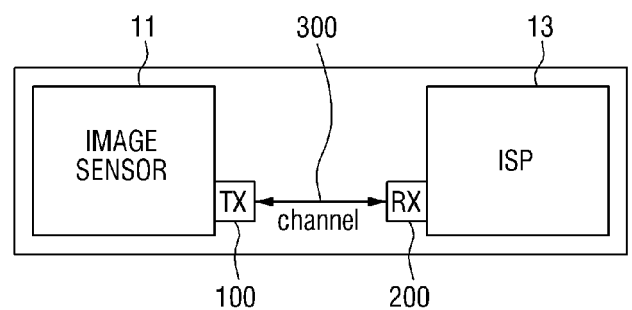
FIG. 1 is a block diagram of an image capture device according to an exemplary embodiment of the present inventive concept.

Advantages and features of the present inventive concept and methods of accomplishing the same may be understood more readily by reference to the following detailed description of preferred exemplary embodiments and the accompanying drawings. The present inventive concept may, however, be embodied in many different forms and should not be construed as being limited to the exemplary embodiments set forth herein. Rather, these exemplary embodiments are provided so that this disclosure will be thorough and complete and will fully convey the concept of the inventive concept to those skilled in the art, and the present inventive concept will only be defined by the appended claims. Like reference numerals refer to like elements throughout the specification.

The terminology used herein is for the purpose of describing particular exemplary embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Exemplary embodiments are described herein with reference to cross-section illustrations that are schematic illustrations of idealized exemplary embodiments (and intermediate structures). As such, variations from the shapes of the illustrations as a result, for example, of manufacturing techniques and/or tolerances, are to be expected. Thus, these exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present inventive concept.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

A data interface and an image capture device including the same according to an exemplary embodiment of the present inventive concept will now be described with reference to FIGS. 1 through 6.

FIG. 1 is a block diagram of an image capture device 10 according to an exemplary embodiment of the present inventive concept.

Referring to FIG. 1, the image capture device 10 may include an image sensor 111, an image data processor (ISP) 13, and a data interface 1, 2 or 3.

The image sensor 11 may sense light, convert the sensed light into an electrical signal, and convert the electrical signal into an analog signal or a digital signal. In addition, the image sensor 11 may perform a filtering function in order for basic image processing (such as converting the format of an image).

The image sensor 11 may be various according to types of image sensor cells. For example, the image sensor 11 may be a charge coupled device (CCD) image sensor or a complementary metal oxide semiconductor (CMOS) image sensor. The image sensor 11 may employ a switching technique.

The CMOS image sensor may create an equal number of MOS transistors to the number of pixels using CMOS technology that can simultaneously integrate a control circuit (i.e., a peripheral circuit) and a signal processing circuit and may detect an output using the MOS transistors. The CMOS image sensor may include a plurality of image sensor cells each of which includes a photodiode and a plurality of MOS transistors. The CMOS image sensor may form an image by converting light (i.e., visible ray) inputted from a frontside or a backside of an image sensor chip into an electrical signal.

The CCD image sensor is a recording element using accumulation and transfer of electric charges. The CCD image sensor may sequentially transfer electrical charges of an analog signal in a predetermined direction and convert an image into an electrical signal using its transfer function.

The CCD image sensor has a relatively simple structure in which a thin oxide layer is formed on a silicon substrate, and a plurality of electrodes are arranged on the oxide layer.

The ISP 13 may process a digital signal received from the image sensor 11. For example, the ISP 13 may convert the color format of the digital signal or correct degraded pixels, etc. The ISP 13 may calibrate the gain of the amount of light of the electrical signal output from the image sensor 11 or adjust the white balance of the electrical signal. The ISP 13 may output the processed image data to a controller unit in an application processor.

The data interface 1, 2 or 3 may include a transmitter 100, a receiver 200, and a channel 300. The transmitter 100 may transmit a digital signal output from the image sensor 11 to the receiver 200 using a plurality of channel lines included in the channel 300. This will be described in detail later.

Figure 2:
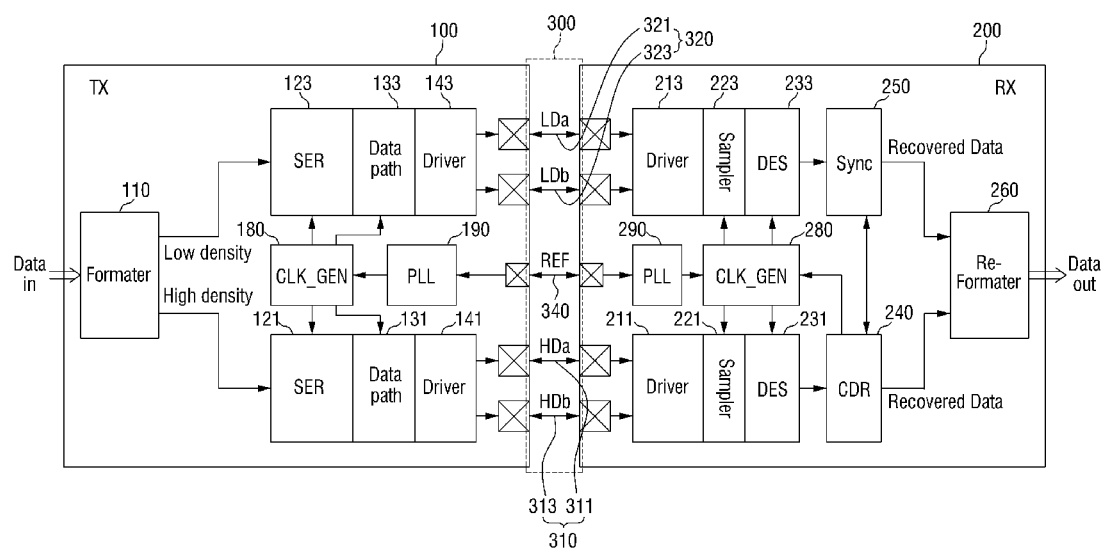
FIG. 2 is a block diagram of a data interface according to an exemplary embodiment of the present inventive concept.

FIG. 2 is a block diagram of a data interface 1 according to an exemplary embodiment of the present inventive concept.

Referring to FIG. 2, the data interface 1 may include a transmitter 100, a receiver 200, and a channel 300. The transmitter 100 may include a formatter 110, serializers 121 and 123, data paths 131 and 133, output drivers 141 and 143, a clock generator 180, and a phase locked loop (PLL) circuit 190.

The formatter 110 may change the format of a received bitset. For example, the formatter 110 may receive a plurality of bitsets, each including N bits (where N is a natural number of 2 or more), and generate a first bitset including least significant bits (LSBs) of each of the plurality of bitsets and a second bitset including most significant bits (MSBs) of each of the plurality of bitsets.

For example, when the formatter 110 may receive a bitset of a first pixel and a bitset of a second pixel each of which includes N bits, the formatter 110 may generate a first bitset including lower N/2 bits of each of the bitsets corresponding to the first and second pixels and a second bitset including upper N/2 bits of each of the bitsets corresponding to the first and second pixels. However, the present inventive concept is not limited to this example, and the formatter 110 may generate a first bitset including the LSB of each of the bitsets, a second bitset including the MSB of each of the bitsets, and a third bitset including a bit located in the middle of each of the bitsets. This will be described in detail later.

The first bitset generated by the formatter 110 may have a greater number of transitions than the second bitset. For example, a raw image may have a plurality of pixel data whose RGB value may change gradually between adjacent pixels. The gradual change of pixel data may make MBS bits less transitional and LSB bits more transitional. That is, bits that form the first bitset change from 1 to 0 or from 0 to 1 in more cases than bits that form the second bitset. Therefore, a channel through which the first bitset moves may be a high-density (HD) channel having a large number of transitions, and a channel through which the second bitset moves may be a low-density (LD) channel having a relatively small number of transitions.

However, transition pattern of LSB bits and MSB bits may vary according to the raw image data. For example, a raw image may have a check board pattern which may have a plurality of edges whose RGB data may change abruptly on the edges of the check board pattern. The abrupt change of RGB on the edges may make MSB bits more transitional and LSB bits less transitional. Therefore, the low-density (LD) channel may transmit a lower transitional bitset of the first bitset and the second bit set, and the high-density (HD) channel may transmit a higher transitional bitset of the first bitset and the second bit set.

The formatter 110 may be connected to a first serializer 121 and a second serializer 123. The first bitset including LSBs generated by the formatter 110 may be sent to the first serializer 121, and the second bitset including MSBs may be sent to the second serializer 123. The formatter 110 may include flip-flops to capture image data from the image sensor 11, which will be divided into the first bitset and the second bitset.

To choose lower or higher transitional bitset based on the first bitset and the second bitset, the formatter 110 may further include a plurality of toggle counters (not shown) to counter the number of transitions in upper bits and lower bits of the image data, an comparator (not shown) to compare the number of transitions of upper bits and lower bits, a plurality of multiplexers (not shown) to assign a higher transitional bits to the first bitset and a lower transitional bits to the second bitset, and a dummy bit generator (not shown) to generate a dummy bit indicating whether the bitset assigned to the first bitset or the second bitset is LSB bitset or MSB bitset.

A pre-logic 151 or 153 (see FIG. 7) may exist between the formatter 110 and the first serializer 121 or between the formatter 110 and the second serializer 123. This will be described in detail later.

The serializers 121 and 123 may include the first serializer 121 and the second serializer 123. The serializers 121 and 123 may convert parallel signals into serial signals. For example, the serializers 121 and 123 may convert input signals in parallel through ten lines into serial output signals through two lines. That is, a ratio of an input to an output of the serializers 121 and 123 may be 10:2. However, the present inventive concept is not limited thereto, and the ratio of the input to the output can vary. For example, the ratio of the input to the output can be changed to n:m (m is smaller than n and is a natural number).

The first and second serializers 121 and 123 may be connected to the clock generator 180. The first and second serializers 121 and 123 may receive a clock generated by the clock generator 180 and convert parallel signals into serial signals in response to the clock. The first seralizer 121 may be connected to a first data path 131, and the second serializer 123 may be connected to the second data path 133.

The data paths 131 and 133 may include the first data path 131 and the second data path 133.

The data paths 131 and 133 may align the serialized data and transmit the aligned serialized data to the output drivers 141 and 143. In addition, the data paths 131 and 133 may combine a plurality of signals received from the serializers 121 and 123 into one signal and transmit the one signal to the output drivers 141 and 143. For example, the serializers 121 and 123 may divide each of the received bitsets into an even signal and an odd signal by selecting even bits and odd bits from the received bitsets to reduce a burden to manipulate high speed serial data before driving the output drivers 141 and 143. When the data paths 131 and 133 receive the even signal and the odd signal from the first serializer 121, the data paths 131 and 133 may align the even signal and the odd signal and combine the even signal and the odd signal into one signal and transmit the combined signal to the output drivers 141 and 143. However, the present inventive concept is not limited thereto.

The first and second data paths 131 and 133 may receive a clock generated by the clock generator 180 and operate in response to the clock. For example, the clock generator 180 may provide a clock having the same frequency to the first and second data paths 131 and 133, but the present inventive concept is not limited thereto.

The output drivers 141 and 143 may amplify received data from the data paths 131 and 133 and transmit the amplified data through the channel 300. The output drivers 141 and 143 may include the first output driver 141 and the second output driver 143.

The first output driver 141 may be connected to the first data path 131 and a first channel 310 of the channel 300. The first output driver 141 may receive a first data (serialized first bitset) from the first data path 131, amplify the received first data, and transmit the amplified first data to the first channel 310. Likewise, the second output driver 143 may be connected to the second data path 133 and a second channel 320 of the channel 300. The second output driver 143 may receive a second data (a serialized second bitset) from the second data path 133, amplify the received second data, and transmit the amplified second data to the second channel 320.

Although not specifically illustrated in the drawing, the data interface 1 may further include an error checker (not illustrated) which deserializes data output from each of the data paths 131 and 133 and determines the occurrence of an error by comparing the deserialized signal with a signal input to each of the serializers 121 and 123. The error checker (not illustrated) may be connected to an output terminal of each of the data paths 131 and 133 and an input terminal of each of the serializers 121 and 123. In addition, the error checker (not illustrated) may be connected to each channel. However, the present inventive concept is not limited thereto.

The first data may have a greater number of transitions than the number of transitions of the second data. Therefore, the first channel 310 of the channel 300 through which the first data is transmitted may be an HD channel, and the second channel 320 of the channel 300 through which the second data is transmitted may be an LD channel.

The PLL circuit 190 may be a frequency negative feedback circuit configured to maintain a constant phase in response to a reference signal. Specifically, the PLL circuit 190 may be an electronic circuit which matches an input signal with a reference frequency and an output signal with a frequency. The PLL circuit 190 may detect a phase difference between the input signal and the output signal and provide the output signal having an particular frequency by controlling a voltage controlled oscillator (VCO). The PLL circuit 190 may maintain a signal in a particular phase. That is, the PLL circuit 190 may set an accurate fixed point so that the phase of a periodic signal does not change. The PLL circuit 190 may be connected to a reference channel 340 of the channel 300 which provides the reference signal. The PLL circuit 190 in the transmitter 100 may share the reference signal with a PLL circuit 290 in the receiver 200. The PLL circuit 190 may provide the reference signal to the clock generator 180.

The clock generator 180 may provide a clock to the serializers 121 and 123 and the data paths 131 and 133 based on the reference signal of the PLL circuit 190. Specifically, the clock generator 180 may receive the reference signal from the PLL circuit 190 and generate a clock for controlling the serializers 121 and 123 and the data paths 131 and 133. The generated clock may be transmitted to the first and second serializers 121 and 123 and the first and second data paths 131 and 133. However, the present inventive concept is not limited thereto.

The channel 300 may include the first channel 310, the second channel 320, and the reference channel 340. The first channel 310 may be connected to the first output driver 141 of the transmitter 100 and a first input driver 211 of the receiver 200 and deliver the first data including the first bitset. The second channel 320 may be connected to the second output driver 143 of the transmitter 100 and a second input driver 213 of the receiver 200 and deliver the second data including the second bitset. The reference channel 340 may be connected to the PLL circuit 190 of the transmitter 100 and the PLL circuit 290 of the receiver 200 and deliver the reference signal.

The first data may have a greater number of transitions than the second data. Therefore, the first channel 310 through which the first data is transmitted may be an HD channel, and the second channel 320 through which the second data is transmitted may be an LD channel.

Each of the first channel 310 and the second channel 320 may include a pair of lines in order to use a differential channel transmission method. In the differential channel transmission method, a positive signal and a negative signal are generated for one transmission signal. Then, the positive signal is transmitted to any one of the pair of lines, and the negative signal is transmitted to the other one of the pair of lines. The input drivers 211 and 213 of the receiver 200 may recover the original transmission signal using a difference between the two signals. Since the differential channel transmission method uses the difference between two signals, it exhibits more resistant characteristics to noise and interference than when a signal is transmitted through a single line.

Therefore, the output drivers 141 and 143 may generate a clock edge modulation signal in order for differential channel transmission. Specifically, a channel driver (not shown) may generate a positive signal and a negative signal for one transmission signal and supply the positive signal and the negative signal to the channel 300. For example, the first output driver 141 may generate a positive signal and a negative signal for the first data including the first bitset and transmit the positive signal through an HDa channel of the first channel 310 and the negative signal through an HDb channel of the first channel 310. The second output driver 143 may also transmit a positive signal and a negative signal through the second channel 320 in the same way as the first output driver 141. However, the present inventive concept is not limited thereto, and the first channel 310 and the second channel 320 can also be formed as a single channel.

The receiver 200 may include the input drivers 211 and 213, samplers 221 and 223, deserializers 231 and 233, a clock data recovery (CDR) circuit 240, a synchronizer 250, a reformatter 260, and the PLL circuit 290.

The input drivers 211 and 213 may include the first input driver 211 connected to the first channel 310 and the second input driver 213 connected to the second channel 320. The input drivers 211 and 213 may be connected to the samplers 221 and 223. Specifically, the first input driver 211 may receive a first differential signal through the first channel 310 and transmit the received first differential signal to the first sampler 221, and the second input driver 213 may receive a second differential signal through the second channel 320 and transmit the received second differential signal to the second sampler 223. The input drivers 211 and 213 may generate one signal by combining a pair of a positive signal and a negative signal transmitted according to the differential channel transmission method. Each of the first and the second differential signal may include a pair of a positive signal and a negative signal, the input drivers 211 and 213 may convert the differential signal into incoming data to provide bitsets to the samplers 223 and 221.

Although not specifically illustrated in the drawing, each of the input drivers 211 and 213 may include a pre-amplifier (not illustrated) or an equalizer (not illustrated). The pre-amplifier (not illustrated) and the equalizer (not illustrated) may compensate for the data size and delay characteristics of a serial data stream received through the channel 300 and transmit the compensated data to the first and second samplers 221 and 223. Specifically, the pre-amplifier (not illustrated) and the equalizer (not illustrated) may receive a serialized data stream through a transmission line, amplify a voltage of the received data, and compensate for the distortion of the data signal due to the jitter of the received data, in particular, inter-symbol interference (ISI) by equalizing the amplified data. However, the present inventive concept is not limited thereto.

The samplers 221 and 223 may include the first sampler 221 and the second sampler 223. The samplers 221 and 223 may sample the incoming data received from the input drivers 211 and 213 based on a sampling clock provided by the clock generator 280. The first sampler 221 and the second sample 223 may obtain serialized data, i.e. sampled data by sampling the incoming data. The first sampler 221 and the second sampler 223 may share a CDR circuit 240.

The first sampler 221 may receive a first incoming data from the first input driver 211. The first sampler 221 may sample the first incoming data based on the sampling clock provided by the clock generator 280 and output a first sampled data.

The second sampler 223 may receive a second incoming data from the second input driver 213. The second sampler 223 may sample the second incoming data based on the sampling clock provided by the clock generator 280 and output a second sampled data.

The deserializers 231 and 233 may include a first deserializer 231 and a second deserializer 233. The first deserializer 231 may convert the first sampled data generated by the first sampler 221 into a first deserialized data such that a ratio of the first sampled data to the first deserialized data is 1:n. An output terminal of the first sampler 221 may be connected to the first deserializer 231. An output signal of the first deserializer 231 may be transmitted to the CDR circuit 240.

The second sampler 223 may be connected to the second deserializer 233. The second deserializer 233 may convert the second sampled data generated by the second sampler 223 into a second deserialized data such that a ratio of the second sampled data to the second deserialized data is 1:n. An output terminal of the second sampler 223 may be connected to the synchronizer 250. An output signal of the first deserializer 233 may be transmitted to the synchronizer 250.

The CDR circuit 240 may receive the output signal of the first deserializer 231 as a phase feedback to adjust the sampling clock phase of the first sampler 221 based on an edge information included in the output signal of the first deserializer 231. The first sampler 221 may sample the first incoming data while maintaining optimal sampling timing by repeating a series of feedback processes described above.

The second sampler 223 may share the CDR circuit 240 with the first sampler 221. The sampling clock that determines the sampling timing of the second sampler 223 may be adjusted by the phase feedback of the CDR circuit 240 according to the output signal of the first deserializer 231.

The CDR circuit 240 may provide a first phase feedback to the clock generator 280 based on edge information of the first deserialized data provided by the first deserializer 231. The clock generator 280 may adjust the sampling timing of the first sampler 221 and the second sampler 223 based on the first phase feedback. The CDR circuit 240 may provide a second phase feedback to the clock generator 280 based on edge information of the second deserialized data provided by the second deserializer 233 or the synchronizer 250. The clock generator 280 may adjust the sampling clock phase of the first sampler 221 and the second sampler 223 based on the second phase feedback.

The clock generator 280 may generate the sampling clock that is provided to the first sampler 221 and the second sampler 223 based on a reference clock generated by the PLL circuit 290 of the receiver 200 and a feedback generated by the CDR circuit 240. In addition, the clock generator 280 may generate a clock that is to be provided to each of the first deserializer 231 and the second deserializer 233.

Although not specifically illustrated in the drawing, the clock generator 280 may include, but not limited to, a phase detector (not illustrated), a phase interpolator controller (not illustrated), and a phase interpolator (not illustrated).

The phase interpolator (not illustrated) may adjust the phase of clock that is input to each of the samplers 221 and 223 by providing a multi-phase clock to the clock generator 280. For example, the phase interpolator (not illustrated) may generate the multi-phase clock having 0°, 90°, 180° and 270° phases based on the reference clock provided by the PLL circuit 290 and adjust the phases of the multi-phase clock based on a digital code value (up/down) received from the phase interpolator controller (not illustrated). The multi-phase clock may be provided to the clock generator 280. However, the present inventive concept is not limited thereto.

The synchronizer 250 may provide the phase feedback to the CDR circuit 240 based on the output signal of the second deserializer 233, thereby adjusting the sampling timing of the second sampler 223 and the skew of the recovered data from the second deserializer 233. The synchronizer 250 may communicate with the CDR circuit 240. That is, the synchronizer 250 may compare the output timings of the recovered data from the CDR circuit 240 and the second deserializer 233 and adjust the skew of output of recovered data from the synchronizer 250 and CDR circuit 240. The CDR circuit 240 may adjust the sampling clock by comparing the output timings of the deserializers 231 and 233 based on the phase feedback from the first deserializer 231 and the synchronizer 250.

Consequently, the formatter 110 of the transmitter 100 of the data interface 1 according to the exemplary embodiment of the present inventive concept may receive first and second image data from the image sensor 11 and convert the first and second image data into a first bitset or a second bitset. Here, the first bitset may include lower bits in the first image data and lower bits in the second image data, and the second bitset may include upper bits except the lower bits in the first image data and upper bits except the lower bits in the second image data.

The first serializer 121 may serialize the first bitset received from the formatter 110, and the second serializer 123 may serialize the second bitset received from the formatter 110.

The first channel 310 of the channel 300 may transmit the serialized first bitset to the first input driver 211 of the receiver 200 through differential channels 311 and 313, and the second channel 320 may transmit the serialized second bitset to the second input driver 213 of the receiver 200 through differential channels 321 and 323.

The first sampler 221 of the receiver 200 may sample the first bitset received from the first input driver 211, and the second sampler 223 may sample the second bitset received from the second input driver 213.

The first deserializer 231 may parallelize the first bitset sampled by the first sampler 221, and the second deserializer 233 may parallelize the second bitset sampled by the second sampler 223.

The CDR circuit 240 and the clock generator 280 may adjust a clock input to each of the first and second samplers 221 and 223 based on an output of the first deserializer 231, thereby adjusting the sampling timing of each of the first and second bitsets. At this time, the synchronizer 250 may provide a feedback to the CDR circuit 240 based on the output of the second deserializer 233, thereby adjusting a skew of the first and second bitsets to recover the first image data and the second image data.

The reformatter 260 may extract the first and second image data from the first and second bitsets. The reformatter 260 may be connected to the synchronizer 250 and the CDR circuit 240. The reformatter 260 may receive the first bitset and the second bitset included in output from the synchronizer 250 and the CDR circuit 240 and extract the first and second image data by carrying out the operations performed by the formatter 110 in a reverse order. That is, the formatter 110 and the reformatter 260 may perform complementary functions.

The first and second image data output from the reformatter 260 may be transmitted to the ISP 13, but the present inventive concept is not limited thereto.

The data interface 1 according to the present inventive concept can be applied to a data communication system having samplers and a CDR circuit. The data interface 1 according to the present inventive concept is not necessarily applied to a data communication system including serializers and deserializers. The data interface 1 can be applied to any data communication system without serializers and/or deserializers as long as the data communication system has samplers and a CDR circuit.

Figure 3:
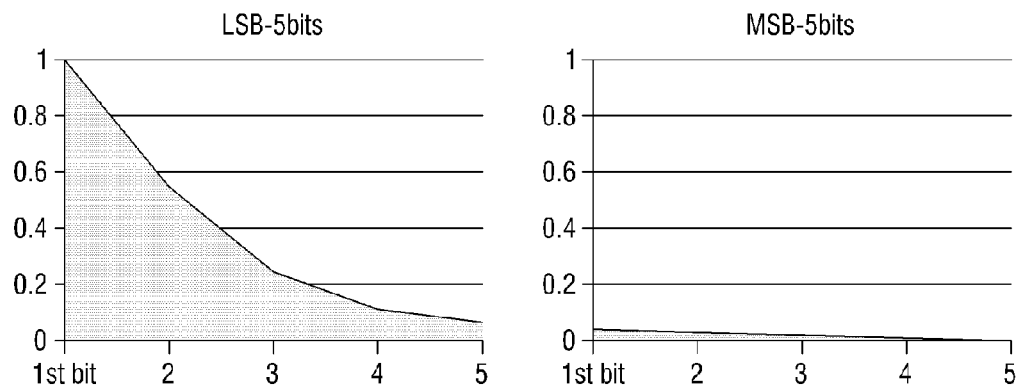
FIG. 3 is a diagram illustrating the frequency of transitions in an input signal of a data interface according to exemplary embodiments of the present inventive concept.

FIG. 3 is a diagram illustrating the frequency of transitions in an input signal of a data interface according to exemplary embodiments of the present inventive concept.

The graph of FIG. 3 illustrates the number of transitions in a 10-bit signal input to a data interface 1 or 2 according to exemplary embodiments of the present inventive concept.

According to the graph, assuming that the number of transitions of the LSB of the input signal is 1, the number of transitions of a sixth bit of the input signal is approximately 0.031. That is, assuming that the number of transitions of the LSB is 100, the number of transitions of the sixth bit may be approximately 3. The number of transitions may be reduced exponentially from the lower-order bit to the higher-order bit. For example, a raw image may have a plurality of pixel data whose RGB value may change gradually between adjacent pixels. The gradual change of pixel data may make MBS bits less transitional and LSB bits more transitional.

However, transition pattern of LSB bits and MSB bits may vary according to the raw image pattern. For example, a raw image may have a check board pattern which may have a plurality of edges whose RGB data may change abruptly on the edges of the check board pattern. The abrupt change of RGB on the edges may make MSB bits more transitional and LSB bits less transitional.

Therefore, the low-density (LD) channel may transmit a lower transitional bitset of the first bitset and the second bit set, and the high-density (HD) channel may transmit a higher transitional bitset of the first bitset and the second bit set. To choose lower or higher transitional bitset based on the first bitset and the second bitset, the formatter 110 may further include a plurality of registers, a plurality of toggle counters to counter the number of transitions in upper bits and lower bits of the image data, an comparator to compare the number of transitions of upper bits and lower bits, a plurality of multiplexers to assign a higher transitional bits to the first bitset and a lower transitional bits to the second bitset, and a plurality of dummy bit generators to generate a dummy bit indicating whether the bitset assigned to the first bitset or the second bitset is LSB bitset or MSB bitset. An exemplary embodiment of the formatter will be described in detail in FIG. 12.

Figure 4:
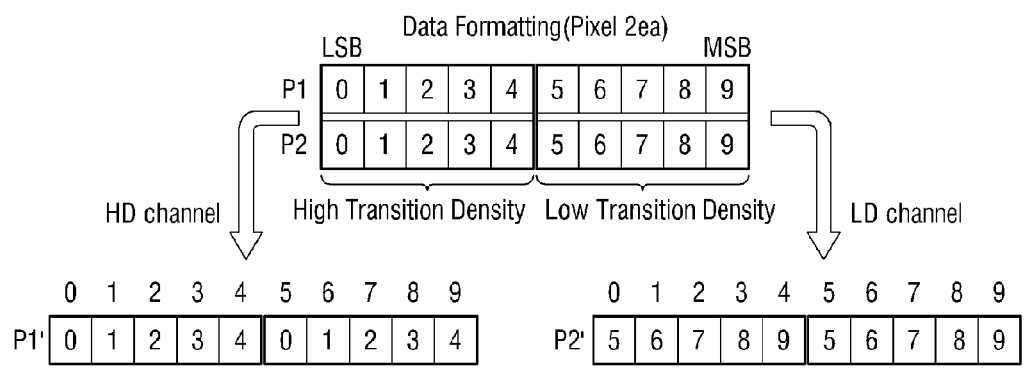
FIG. 4 is a diagram illustrating a data format changing method of a data interface according to exemplary embodiments of the present inventive concept.

FIG. 4 is a diagram illustrating a data format changing method of a data interface according to exemplary embodiments of the present inventive concept.

Referring to FIG. 4, the formatter 110 may perform a data formatting process for converting a first image data P1 and a second image data P2 into a first bitset P1' and a second bitset P2'.

The first bitset P1' may include a first bit which is included in the first image data P1 and a third bit which is included in the second image data P2. The second bitset P2' may include a second bit which is included in the first image data P1 and is a higher-order bit than the first bit and a fourth bit which is included in the second image data P2 and is a higher-order bit than the third bit.

For example, if each of the first image data P1 and the second image data P2 include 10 bits, five lower bits of the first image data P1 and five lower bits of the second image data P2 may be combined to produce the first bitset P1'. In the same way, five upper bits of the first image data P1 and five upper bits of the second image data P2 may be combined to produce the second bitset P2'.

Since the first bitset P1' includes five lower bits, it may include a greater number of transitions than the second bitset P2'. Accordingly, the first channel 310 may transmit the first bitset P1' of a high density, and the second channel 320 may transmit the second bitset P2' of a low density.

Since the first bitset P1' includes a sufficient number of transitions, line coding may not be required. Line coding requires additional bits for decoding. Therefore, if line coding is not performed, a bandwidth corresponding to additional bits required for line coding can be secured additionally. For example, 2 additional bits are required to perform line coding on a 10-bit input signal. In this case, the omission of line coding can additionally secure a bandwidth of approximately 20%.

The second bitset P2' may include a significantly smaller number of transitions than the first bitset P1'. Thus, the second bitset P2' does not require a dedicated CDR circuit 240. Instead, the second bitset P2' can be sampled using a CDR circuit 240 utilized for the first bitset P1' and then synchronized with the first bitset P1'.

Accordingly, there is no need for each channel to include a independent CDR circuit. Instead, two channels can share a CDR circuit, thereby reducing the size and complexity of the data interface. In addition, since the CDR circuit 240 consumes a large amount of power, a reduction in the number of CDR circuits 240 can result in a reduction in power consumption and cost.

Furthermore, the amount of power consumed by elements (such as the second serializer 123, the second deserializer 233, the second sampler 223, etc.) connected to a channel through which the second bitset P2' passes can be reduced.

On the other hand, as mentioned above, transition pattern of LSB bits and MSB bits may vary according to the raw image pattern. The low-density (LD) channel may transmit a lower transitional bitset of the first bitset and the second bit set, and the high-density (HD) channel may transmit a higher transitional bitset of the first bitset and the second bit set. To choose lower or higher transitional bitset based on the first bitset and the second bitset, the formatter 110 may further include a plurality of registers, a plurality of toggle counters to counter the number of transitions in upper bits and lower bits of the image data, an comparator to compare the number of transitions of upper bits and lower bits, a plurality of multiplexers to assign a higher transitional bits to the first bitset and a lower transitional bits to the second bitset, and a plurality of dummy bit generators to generate a dummy bit indicating whether the bitset assigned to the first bitset or the second bitset is LSB bitset or MSB bitset. An exemplary embodiment of the formatter will be described in detail in FIG. 12.

Figure 5:
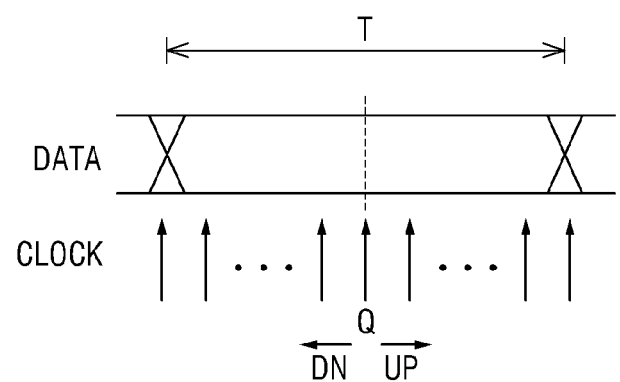
FIG. 5 is a conceptual diagram illustrating the functions of a clock data recovery (CDR) circuit of a data interface according to exemplary embodiments of the present inventive concept.

FIG. 5 is a conceptual diagram illustrating the functions of the CDR circuit 240 of a data interface according to exemplary exemplary embodiments of the present inventive concepts.

Referring to FIG. 5, the samplers 221 and 223 may obtain data at a particular moment by sampling an incoming data. The sampling timing of each of the samplers 221 and 223 can be adjusted by a sampling clock input to each of the samplers 221 and 223. Arrows illustrated in FIG. 5 indicate sampling points of the samplers 221 and 223.

A plurality of transitions may occur in an input signal. Each of the samplers 221 and 223 may sample multiple times in each period T by oversampling scheme. For example, each of the samplers 221 and 223 may perform sampling eight times based on a multi-phase clock input provided by the clock generator 280, but the present inventive concept is not limited thereto.

The CDR circuit 240 may successively receive phase difference information from the samplers 221 and 223 and/or the deserializer 231 and 233, analyze the phase difference information, and adjust the phase of the multi-phase clock input. The CDR circuit 240 may transmit a feedback signal to the clock generator 280 such that the sampling times of the samplers 221 and 223 can come in the middle of one period. Q means the center between both edges of the incoming data. The clock generator 280 may generate the multi-phase clock based on the received feedback signal. However, the present inventive concept is not limited to the above example.

Figure 6:
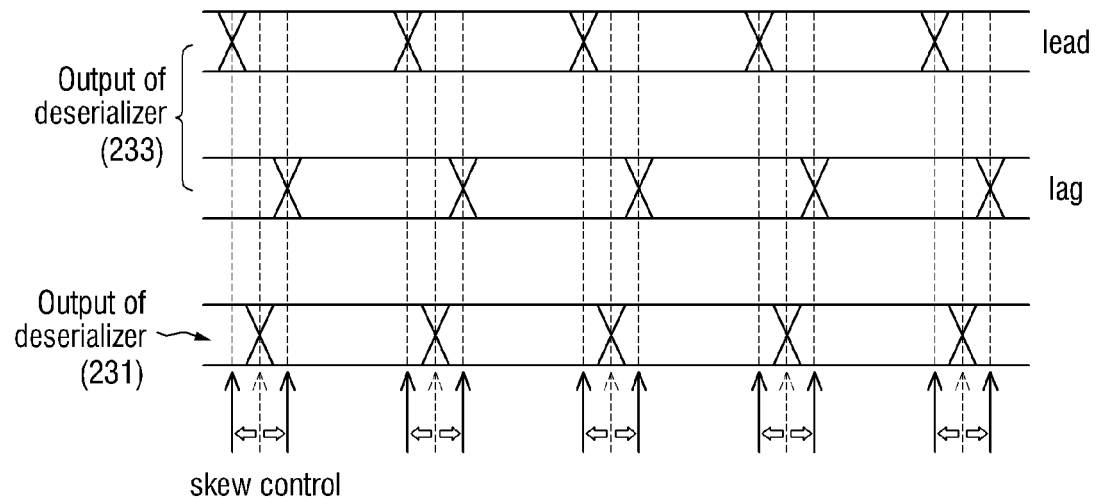
FIG. 6 is a timing diagram illustrating a sampling operation of samplers according to another exemplary embodiment of the present inventive concept.

FIG. 6 is a timing diagram illustrating sampling operation of the samplers 221 and 223 according to exemplary embodiments of the present inventive concept.

Referring to FIG. 6, the CDR circuit 240 provides a timing feedback to the synchronizer 250 to synchronize outputs of the recovered data from the HD channel 310 and the LD channel 320. To synchronize the outputs of the recovered data, the synchronizer 250 may adjust a skew of the output of the deserializer 233. The CDR circuit 240 may generate a circuit delay from the output of the first deserializer 231 to the reformatter 260 through the CDR circuit 240. The synchronizer 250 may adjust a skew from the second deserializer 233 to the reformatter 260 based on the timing feedback from the CDR circuit 240.

Figure 7:
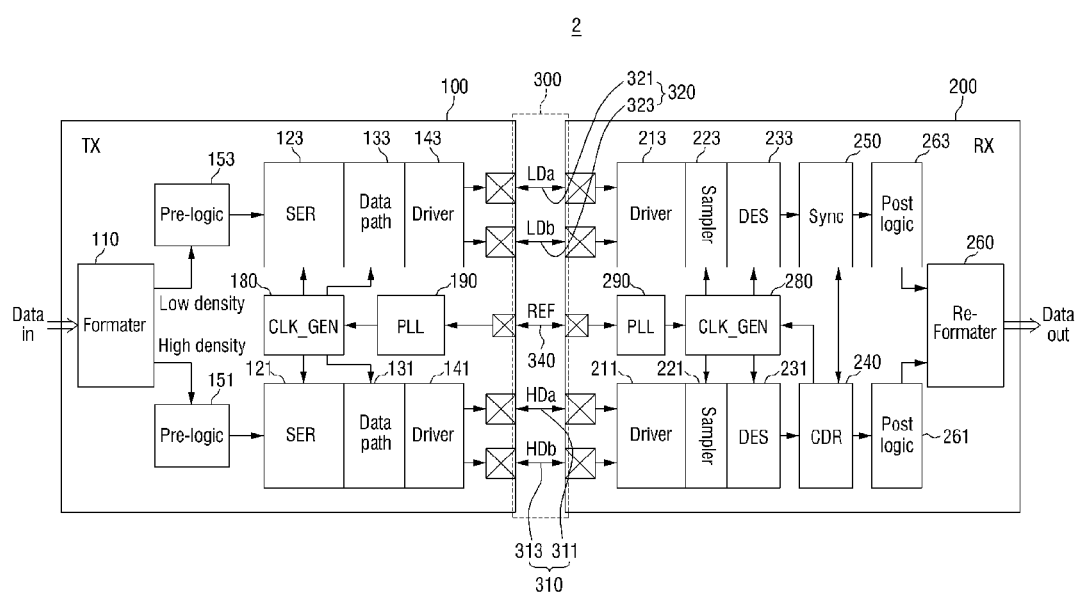
FIG. 7 is a block diagram of a data interface according to another exemplary embodiment of the present inventive concept.
Figure 8:
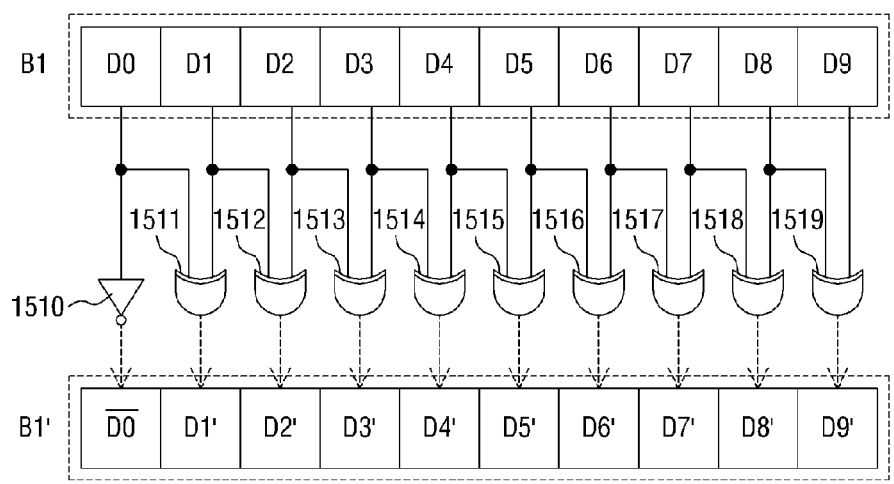
FIG. 8 is a block diagram of an exemplary structure of a pre-logic circuit illustrated in FIG. 7.
Figure 9:
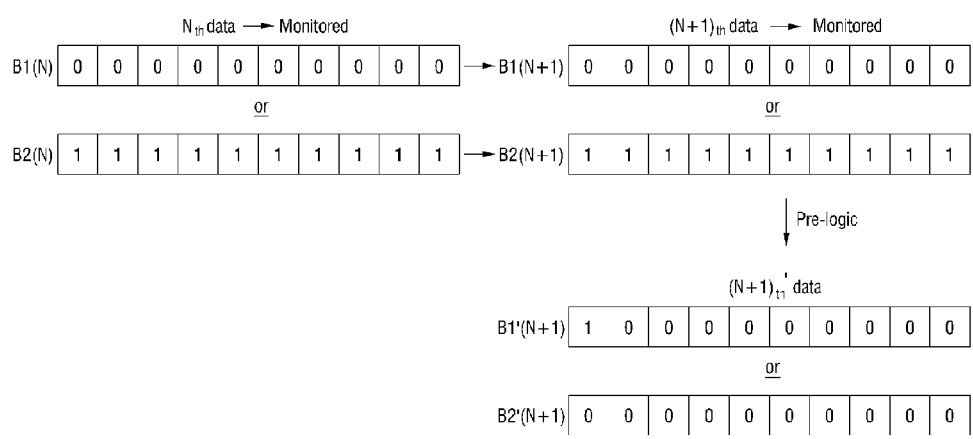
FIG. 9 is a diagram illustrating an operation of the pre-logic circuit of FIG. 7.

FIG. 7 is a block diagram of a data interface 2 according to another exemplary embodiment of the present inventive concept. FIG. 8 is a block diagram of the structure of a pre-logic circuit illustrated in FIG. 7. FIG. 9 is a diagram illustrating the operation of the pre-logic circuit of FIG. 7. For simplicity, a description of elements substantially identical to those of the above-described exemplary embodiment will be omitted, and the exemplary embodiment of the present inventive concept will hereinafter be described, focusing mainly on differences with the above-described exemplary embodiment.

Referring to FIG. 7, the data interface 2 according to the exemplary embodiment of the present inventive concept may include a transmitter 100, a receiver 200, and a channel 300. The transmitter 100 may further include pre-logics 151 and 153. The receiver 200 may further include post-logics 261 and 263. The data interface 2 according to the exemplary embodiment of the present inventive concept may be substantially the same as the data interface 1 described above with reference to FIG. 2.

The transmitter 100 may include a formatter 110, the pre-logics 151 and 153, serializers 121 and 123, data paths 131 and 133, and output drivers 141 and 143. The formatter 110 may receive first and second image data from the image sensor 11 and convert the first and second image data into first and second bitsets. The first bitset may include a first bit which is included in the first image data and a third bit which is included in the second image data. The second bitset may include a second bit which is included in the first image data and is a higher-order bit than the first bit and a fourth bit which is included in the second image data and is a higher-order bit than the third bit. For example, if each of the first and second image data has N bits (where N is an even number), the first bitset may include N/2 lower bits of the first and second image data, and the second bitset may include N/2 upper bits of the first and second image data. However, the present inventive concept is not limited thereto, and when each of the first and second image data has an odd number of bits, it can also be divided into higher-order bits and lower-order bits.

Referring to FIGS. 8 and 9, when the first or second bitset received from the formatter 110 does not include a transition, each of the pre-logics 151 and 153 may convert the first or second bitset into a bitset including one or more transitions. The pre-logics 151 and 153 may include a first pre-logic 151 which operates when there is no transition in the first bitset and a second pre-logic 153 which operates when there is no transition in the second bitset. The first pre-logic 151 and the second pre-logic 153 may be connected to the formatter 110. The first pre-logic 151 may receive the first bitset from the formatter 110, and the second pre-logic 153 may receive the second bitset that is less transitional than the first bitset from the formatter 110, but the present inventive concept is not limited thereto.

Each of the pre-logics 151 and 153 may include an inverter 1510 and XOR gates 1511 through 1519.

The inverter 1510 may invert the LSB D0 of the first or second bitset, and the XOR gates 1511 through 1519 may receive two successive bits and output a result value to higher-order bits D1 through D9 than the LSB D0. For example, referring to FIG. 8, each of the pre-logics 151 and 153 receiving a 10-bit input may include one inverter 1510 and nine XOR gates 1511 through 1519. The inverter 1510 may invert the bit D0, and the first XOR gate 1511 may receive the bits D0 and D1 and generate an output of a bit D1'. Likewise, the second XOR gate 1512 may receive the bits D1 and D2 and generate an output of a bit D2'.

Referring to FIG. 9, the pre-logics 151 and 153 monitor bitsets received from the formatter 110. If an Nth bitset B1(N) or B2(N) without a transition and an (N+1)th bitset B1(N+1) or B2(N+1) without a transition are input successively, each of the pre-logics 151 and 153 may operate. For example, if the Nth bitset B1(N+1) or B2(N+1) having '0000000000' or '1111111111' and the (N+1)th bitset B1(N+

1) or B2(N+1) also having '0000000000' or '1111111111' are input successively, each of the pre-logics 151 and 153 may operate. In this case, the inverter 1510 of each of the pre-logics 151 and 153 may generate a transition by inverting the LSB of the (N+1)th bitset B1(N+1) or B2(N+1). If signals without transitions are continuously input, the receiving end may have problems (e.g., may miss sampling timings or edges) when sampling the signals. To prevent these problem, each of the pre-logics 151 and 153 is provided to convert a signal without a transition into a signal B1'(N+1) or B2'(N+1) having a transition. A bit converted by each of the pre-logics 151 and 153 may be inversely converted into the original signal by the receiving end.

Referring back to FIG. 7, the first serializer 121 may be connected to the first pre-logic 151 and serialize the first bitset received from the first pre-logic 151. The second serializer 123 may be connected to the second pre-logic 153 and serialize the second bitset received from the second pre-logic 153.

The data paths 131 and 133 may include a first data path 131 and a second data path 133. The data paths 131 and 133 may transmit received serialized data to the output drivers 141 and 143. The first serializer 121 may be connected to the first data path 131, and the second serializer 123 may be connected to the second data path 133.

The first and second serializers 121 and 123 and the first and second data paths 131 and 133 may receive a clock generated by a clock generator 280 and operate using the received clock. For example, the clock generator 280 may provide clocks of the same frequency to the first and second data paths 131 and 133, but the present inventive concept is not limited thereto.

The output drivers 141 and 143 may amplify data received from the first and second data paths 131 and 133 and transmit the amplified data through the channel 300. The output drivers 141 and 143 may include a first output driver 141 and a second output driver 143. The first output driver 141 may be connected to the first data path 131 and a first channel 310 of the channel 300. The first output driver 141 may receive first data (the serialized first bitset) from the first data path 131, amplify the received first data, and transmit the amplified first data to the first channel 310. Likewise, the second output driver 143 may be connected to the second data path 133 and a second channel 320 of the channel 300.

The data interface 2 includes the pre-logics 151 and 153 in addition to the elements of the data interface 1 of FIG. 2. The pre-logics 151 and 153 can solve the problem of the formatter 110 continuously transmitting signals without a transition in the process of generating and transmitting the first bitset and the second bitset.

A reformatter 260 may be connected to the first and second post-logics 261 and 263 connected to the first and second synchronizers 251 and 253 respectively. The post-logics 211 and 263 may carry out the operations performed by the pre-logics 151 and 153 in a reverse order, thereby extracting the first and second bitsets from the first through third bitsets.

To choose lower or higher transitional bitset based on the first bitset and the second bitset, the formatter 110 may further include a plurality of registers, a plurality of toggle counters to counter the number of transitions in upper bits and lower bits of the image data, an comparator to compare the number of transitions of upper bits and lower bits, a plurality of multiplexers to assign a higher transitional bits to the first bitset and a lower transitional bits to the second bitset, and a plurality of dummy bit generators to generate a dummy bit indicating whether the bitset assigned to the first bitset or the second bitset is LSB bitset or MSB bitset. An exemplary embodiment of the formatter will be described in detail in FIG. 12.

Figure 10:
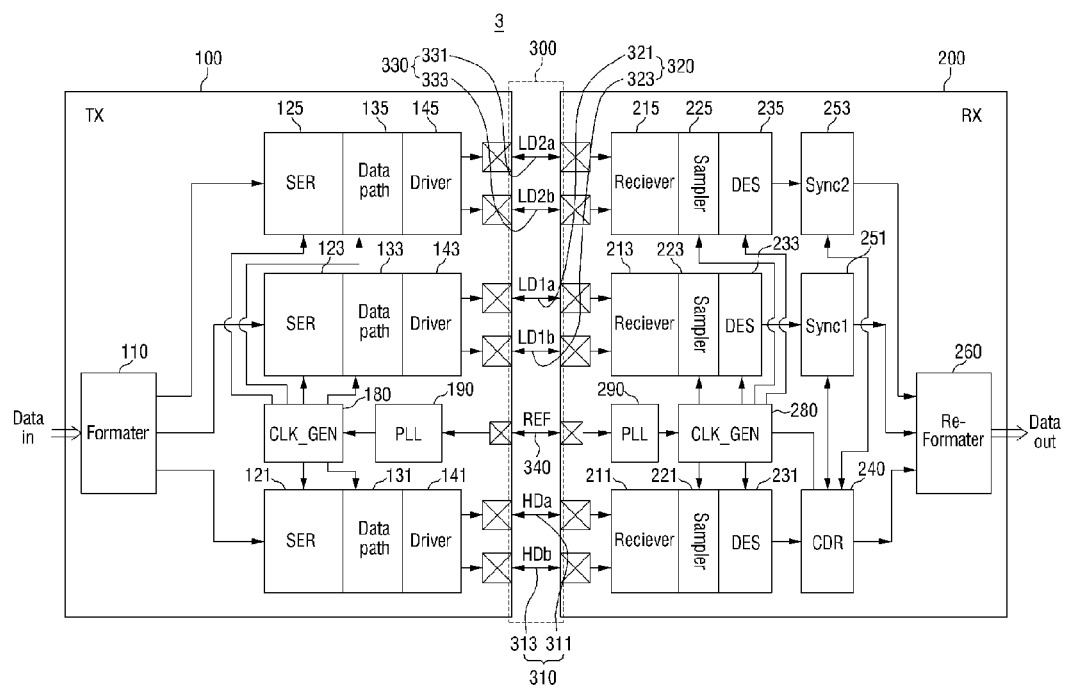
FIG. 10 is a block diagram of a data interface according to another exemplary embodiment of the present inventive concept.
Figure 11:
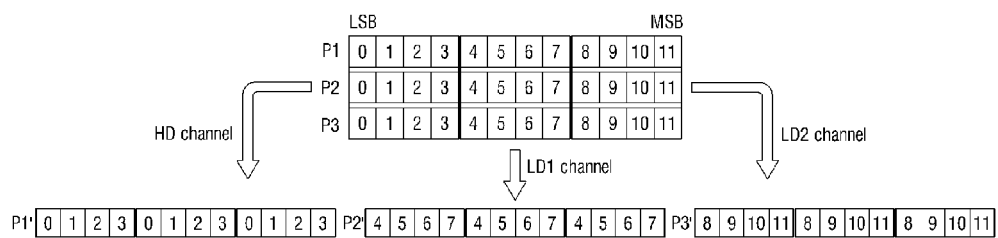
FIG. 11 is a diagram illustrating a data format changing method of a data interface according to another exemplary embodiment of the present inventive concept.

FIG. 10 is a block diagram of a data interface 3 according to another exemplary embodiment of the present inventive concept. FIG. 11 is a diagram illustrating a data format changing method of the data interface 3 according to another exemplary embodiment of the present inventive concept. For simplicity, a description of elements substantially identical to those of the above-described exemplary embodiments will be omitted, and the exemplary embodiment of the present inventive concept will hereinafter be described, focusing mainly on differences with the above-described exemplary embodiments.

Referring to FIGS. 10 and 11, the data interface 3 according to the exemplary embodiment of the present inventive concept may be substantially the same as the data interface 1 described above with reference to FIG. 2. The data interface 3 according to the exemplary embodiment of the present inventive concept may include a transmitter 100, a receiver 200, and a channel 300. The transmitter 100 may further include a third serializer 125, a third data path 135, and a third output driver 145.

A formatter 110 may convert first and second image data into first through third bitsets. The first bitset may include a first bit which is included in the first image data and a third bit which is included in the second image data. The second bitset may include a second bit which is included in the first image data and is a higher-order bit than the first bit and a fourth bit which is included in the second image data and is a higher-order bit than the third bit. The third bitset may include a fifth bit which is included in the first image data and located between the first bit and the second bit and a sixth bit which is included in the second image data and located between the third bit and the fourth bit. That is, the third bitset may include middle bits of an input image data.

The above conversion may be accomplished by combining two or more input image data. For example, referring to FIG. 11, if first through third 12-bit image data P1 through P3 are input, a first bitset P1' may include four LSBs of each of the first through third image data P1 through P3, and a second bitset P3' may include four MSBs of each of the first through third image data P1 through P3. A third bitset P2' may include the remaining four bits of each of the first through third image data P1 through P3. The first bitset P1' may include a largest number of transitions, and the second bitset P3' may include a smallest number of transitions. The number of transitions included in the third bitset P2' may be between the number of transitions included in the first bitset P1' and the number of transitions included in the second bitset P3'.

Referring back to FIG. 10, the first bitset generated by the formatter 110 is transmitted to a first serializer 121, and the second bitset is transmitted to a second serializer 123. The subsequent processes are the same as those of the data interface 1 described above with reference to FIG. 2. The third bitset is transmitted to the third serializer 125. The third bitset is serialized and then transmitted to the third output driver 145 through the third data path 135. The third output driver 145 may transmit the third bitset to the receiver 200 via the channel 300.

Although not specifically illustrated in the drawing, the transmitter 100 may further include a third pre-logic (not illustrated) which converts the third bitset into a bitset including one or more transitions when the third bit set received from the formatter 110 does not include a transition.

The channel 300 may further include a third channel 330. The third channel 330 may include a pair of differential channels 331 and 333.

The receiver 200 may further include a third receiver 215, a third sampler 225, a third deserializer 235, and a second synchronizer 253. The third receiver 215 may receive a signal through the third channel 330 and transmit the received signal to the third sampler 225. The third receiver 215 may generate one signal by combining a pair of a positive signal and a negative signal transmitted using the differential channel transmission method.

The third sampler 225 may sample the signal received from the third receiver 215 according to sampling timing. The third sampler 225 may obtain serialized data by sampling the signal. The third sampler 225 may share one CDR circuit 240 with first and second samplers 221 and 223. The third sampler 225 may be connected to the third deserializer 235.

The third deserializer 235 may convert serialized data sampled by the third sampler 225 into parallel data such that a ratio of the serialized data to the parallel data is 1:n and may output deserialized data.

The third sampler 225 and the third deserializer 235 may operate in response to a clock generated by the clock generator 280.

Synchronizers 250 may include a first synchronizer 251 and a second synchronizer 253. The first synchronizer 251 may be connected to a second deserializer 233, and the second synchronizer 253 may be connected to the third deserializer 235.

The first synchronizer 251 may communicate with the CDR circuit 240 and provide a feedback to the CDR circuit 240, thereby adjusting the sampling timing of the second sampler 223.

The second synchronizer 253 may communicate with the CDR circuit 240 and provide a feedback to the CDR circuit 240, thereby adjusting the sampling timing of the third sampler 225. The sampling timing of the samplers 221, 223, and 225 may be controlled by a clock generated by the CDR circuit 240 in response to the feedbacks from the first deserializer 231, the first synchronizer 251 and second synchronizer 253. The first synchronizer 251 and the second synchronizer 253 may have the same structure and operate in substantially the same way as the synchronizer 250 described above with reference to FIG. 2.

A reformatter 260 may be connected to the first and second synchronizers 251 and 253 and the CDR circuit 240. The reformatter 260 may carry out the operations performed by the formatter 110 in a reverse order, thereby extracting the first and second image data from the first through third bitsets.

The data interface 3 may include an additional channel that shares the CDR circuit 240 in addition to the elements of the data interface 1 of FIG. 2. Therefore, as the number of transmission channels increase, the bandwidth of the channel 300 can be improved. In addition, since the number of CDR circuits 240 and the number of clock generators 280 can be reduced, the power consumption, complexity and size of the circuit can further be reduced.

To choose lower or higher transitional bitset based on the first bitset and the second bitset, the formatter 110 may further include a plurality of registers, a plurality of toggle counters to counter the number of transitions in upper bits and lower bits of the image data, an comparator to compare the number of transitions of upper bits and lower bits, a plurality of multiplexers to assign a higher transitional bits to the first bitset and a lower transitional bits to the second bitset, and a plurality of dummy bit generators to generate a dummy bit indicating whether the bitset assigned to the first bitset or the second bitset is LSB bitset or MSB bitset. An exemplary embodiment of the formatter will be described in detail in FIG. 12.

Figure 12:
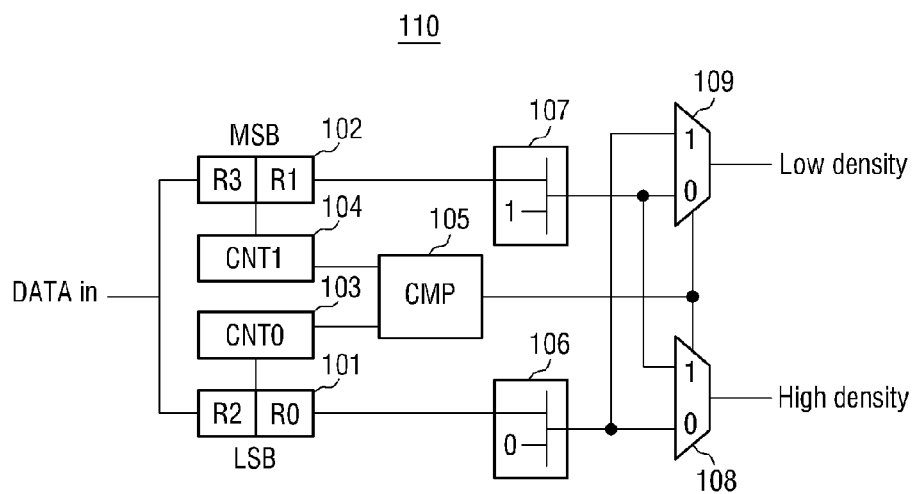
FIG. 12 is a block diagram of an formatter according to an exemplary embodiment of the present inventive concept.

FIG. 12 is a block diagram of formatter according to an exemplary embodiment of the present inventive concept.

Referring to FIG. 12, the formatter 110 may include a plurality of registers 101 and 102, a plurality of counters 103 and 104 to counter the number of serial transitions in upper bits and lower bits of the image data, an comparator 105 to compare the number of serial transitions of upper bits and lower bits, a plurality of multiplexers 108 and 109 to assign a higher transitional bits to the first bitset and a lower transitional bits to the second bitset, and a plurality of dummy bit generator 106 and 107 to generate a dummy bit indicating whether the bitset assigned to the first bitset or the second bitset is LSB bitset or MSB bitset.

Each of the first register 101 and the second register 102 may receive and store lower bits and upper bits of a first image data and a second image data respectively. The first image data and the second image data may be RGB data of a pixel of a image sensor. Each of the counters 103 and 104 may be connected between the first and second registers 101 and 102 and the comparator 105, and may count the number of serial transitions in the upper bits and the lower bits stored in the first and second registers 101 and 102 respectively. The comparator 105 may receive a first counter value and a second counter value from the first counter 103 and the second counter 104 and compare the first counter value with the second counter value. When the first counter value is greater than or equal to the second counter value, the comparator 105 may output logic low to the multiplexers 108 and 109 and may output the lower bits to a high density channel and the upper bits to a low density channel. When the first counter value is smaller than the second counter value, the comparator 105 may output logic high to the multiplexers 108 and 109 and may output the lower bits to a low density channel and the upper bits to a high density channel. The dummy bit generators 106 and 107 and add an additional bit 0'$b$ to the lower bits and an additional bit 1'$b$ to the upper bits to indicate which bitset is the upper bits or the second bits. If the first image data and the second image data is 10-bit image data, the image data output from the high density channel and the low density channel may be 11-bit image data due to the additional dummy bit.

The reformatter 260 may extract the first image data and the second image data based on the dummy bit attached to each of the upper bits and the lower bits.

Figure 13:
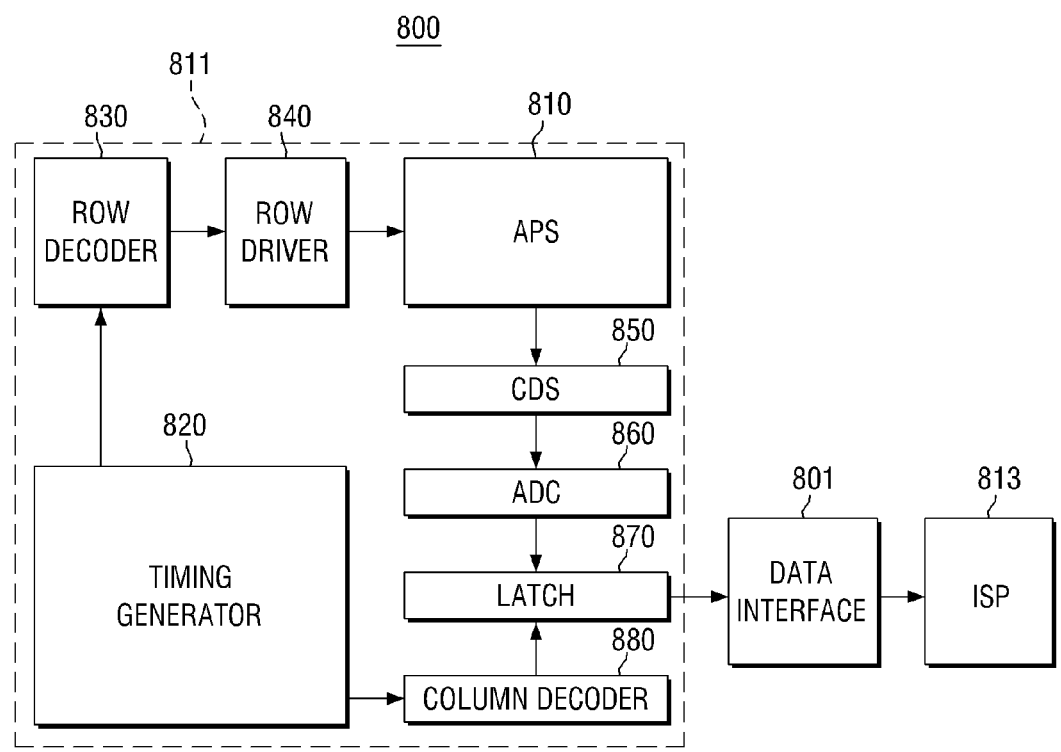
FIG. 13 is a block diagram of an image capture device according to another exemplary embodiment of the present inventive concept.

FIG. 13 is a block diagram of an image capture device 800 according to another exemplary embodiment of the present inventive concept.

Referring to FIG. 13, the image capture device 800 according to the exemplary embodiment of the present inventive concept may include an image sensor 811 and an ISP 813. The image sensor 811 may include an active pixel sensor (APS) array 810 composed of pixels (each pixel including a photoelectric converter) arranged two-dimensionally, a timing generator 820, a row decoder 830, a row driver 840, a correlated double sampler (CDS) 850, an analog-to-digital converter (ADC) 860, a latch 870, and a column decoder 880.

The APS array 810 includes a plurality of unit pixels arranged two-dimensionally. The unit pixels convert optical images into electrical output signals. The APS array 810 may be driven by a plurality of driving signals including a row select signal, a reset signal and a charge transfer signal received from the row driver 840. In addition, the electrical output signals may be provided to the CDS 850 through a vertical signal line.

The APS array 810 may include a plurality of complementary metal oxide semiconductor (CMOS) image pixels. Although not specifically illustrated in the drawing, the pixels included in the APS array 810 may be arranged in a Bayer pattern or a chess mosaic pattern. If Bayer pattern technology is employed, the pixels of the APS array 810 may be arranged to receive red light, green light, and blue light. However, the spirit of the present inventive concept is not limited thereto, and the arrangement pattern of the active pixels in the APS array 810 can be changed to any pattern. For example, in some other exemplary embodiments of the present inventive concept, the active pixels of the APS array 810 may be arranged to receive magenta light (Mg), yellow light (Y), cyan light (Cy) and/or white light (W).

The timing generator 820 may provide a timing signal and a control signal to the row decoder 830 and the column decoder 880.

The row driver 840 may provide a plurality of driving signals for driving the unit pixels to the APS array 810 based on the decoding result of the row decoder 830. Generally, if the unit pixels are arranged in a matrix, the row driver 840 may provide a driving signal to each row of the matrix.

The CDS 850 may receive an output signal formed by the APS array 810 through the vertical signal line and hold and sample the received signal. That is, the CDS 850 may double-sample a particular noise level and a signal level of the output signal and output a difference level corresponding to a difference between the noise level and the signal level.

The ADC 860 may convert an analog signal corresponding to the difference level into a digital signal and output the digital signal.

The latch 870 may latch digital signals and sequentially transmit the latched signals to the ISP 813 according to the decoding result of the column decoder 880.

The ISP 813 may be substantially the same as the ISP 13 described above with reference to FIG. 1. The ISP 813 may calibrate the gain of the amount of light of the electrical signal output from the image sensor 811 or adjust the white balance of the electrical signal. The ISP 813 may receive exposure data (i.e., an image data) of a captured image and remove noise from the received image data through correction.

A data interface 801 may be located between the image sensor 811 and the ISP 813 and transmit first and second image data received from the image sensor 811 to the ISP 813. The data interface 801 may operate in substantially the same way the data interfaces 1 through 3 described above.

The first image data may include a first bit and a second bit which is a higher-order bit than the first bit, and the second image data may include a third bit and a fourth bit which is a higher-order bit than the third bit.

The data interface 801 may include a transmitter and a receiver. The transmitter transmits a first bitset which includes the first bit and the third bit and a second bitset which includes the second bit and the fourth bit. The receiver includes a CDR circuit which samples each of the first and second bitsets and adjusts the sampling timing of each of the first and second bitsets by adjusting a clock used in the process of sampling each of the first and second bitsets.

Here, the first and second image data may be input to the transmitter as parallel signals, and the transmitter may convert the first and second bitsets into serial signals and transmit the serial signals to the receiver.

Figure 14:
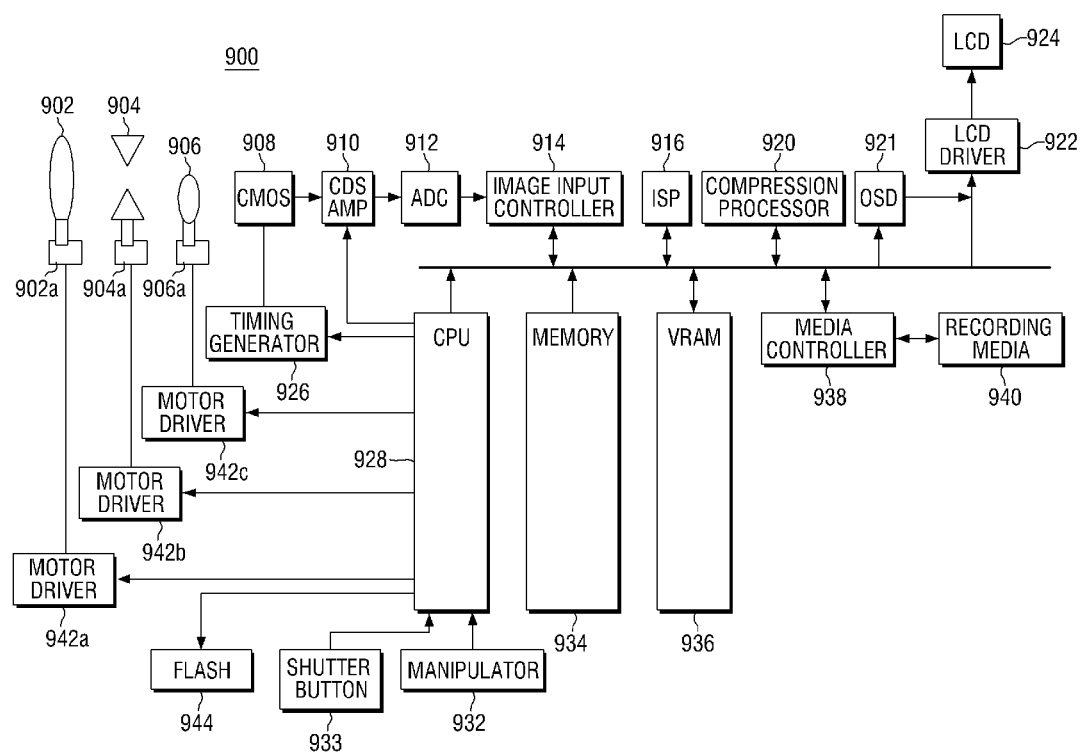
FIG. 14 is a block diagram of an image capture device according to another exemplary embodiment of the present inventive concept.

FIG. 14 is a block diagram of an image capture device 900 according to another exemplary embodiment of the present inventive concept.

Referring to FIG. 14, the image capture device 900 according to the exemplary embodiment of the present inventive concept may include a zoom lens 902, an aperture 904, a focus lens 906, drivers 902*a*, 904*a* and 906*a*, a CMOS element 908, an amplifier-integrated CDS circuit 910, an ADC 912, an image input controller 914, an ISP 916, an compression processor 920, an on-screen display (OSD) 921, a liquid crystal display (LCD) driver 922, an LCD 924, a timing generator 926, a central processing unit (CPU) 928, a manipulator 932, a shutter button 933, a memory 934, a video random access memory (VRAM) 936, a media controller 938, a recording media 940, motor drivers 942*a* through 942*c*, and a flash 944.

The zoom lens 902 is a lens whose focal distance continuously changes as it is moved back and forth in an optical axis direction by the driver 902*a*. A subject can be photographed by changing the size of the subject using the zoom lens 902. When an image is captured, the aperture 904 is controlled by the driver 904*a* to adjust the amount of light entering the CMOS element 908. The focus lens 906 can adjust the pint of a subject as it is moved back and forth in the optical axis direction by the driver 906*a*.

In FIG. 14, one zoom lens 902 and one focus lens 906 are illustrated. However, two or more zoom lenses 902 and two or more focus lenses 906 can also be provided.

The CMOS element 908 is an element that converts light incident from the zoom lens 902, the aperture 904 and the focus lens 906 into an electrical signal. In the exemplary embodiment of the present inventive concept, the time required to extract an electrical signal is adjusted by controlling incident light using an electronic shutter. The time required to extract an electrical signal can be adjusted by controlling incident light using a electric shutter. In an exemplary embodiment of the present inventive concept, the zoom lens 902, the aperture 904, the focus lens 906 and the CMOS element 908 may form a capture unit. However, the structure of the capture unit is not limited to the above example, and the capture unit may not include the zoom lens 902 or the aperture 904.

In some exemplary embodiments of the present inventive concept, the CMOS element 908 is used. The amplifier-integrated CDS circuit 910 is an integration of a CDS circuit (a type of sampling circuit) which removes noise of an electrical signal output from the CMOS element 908 and an amplifier which amplifies the electrical signal having the noise removed. However, the present inventive concept is not limited thereto. In the exemplary embodiment of the present inventive concept, a circuit including a CDS circuit and an amplifier integrated with each other is included in the image capture device 900. However, the CDS circuit and the amplifier can also be provided as separate circuits.

The ADC 912 may generate raw data of an image by converting an electrical signal generated by the CMOS element 908 into a digital signal.

The image input controller 914 may control the input of the raw data of the image generated by the ADC 912 to the memory 934.

The ISP 916 may calibrate the gain of the amount of light of an electrical signal output from the CMOS element 908 or adjust the white balance of the electrical signal. The ISP 916 obtains exposure data of a captured image. The exposure data may include a focusing evaluation value (an auto focus (AF) value) or an auto exposure (AE) value. The ISP 916 may calculate the focusing evaluation value or the AE evaluation value.

Although not specifically illustrated in the drawing, the ISP 916 may receive the generated raw data of the image from the image input controller 914 using any one of the data interfaces 1 through 3 according to the exemplary embodiments of the present inventive concept. However, the present inventive concept is not limited thereto, and the data interfaces 1 through 3 can also be used for communication among all modules within the image capture device 900.

The compression processor 920 may compress an image developed by the ISP 916 into image data in an appropriate format. The compression format of an image may include a reversible format and an irreversible format. Examples of the appropriate format may include a Joint Photographic Experts Group (JPEG) format or a JPEG 2000 format.

The OSD 921 may display the setting screen of the image capture device 900 on the LCD 924. The LCD 924 may display a live view before a photographing operation, various setting screens of the image capture device 900, or captured images, but the present inventive concept is not limited thereto. The display of image data or various information of the image capture device 900 on the LCD 924 may be accomplished by the LCD driver 922.

The timing generator 926 inputs a timing signal to the CMOS element 908. The timing signal generated by the timing generator 926 determines shutter speed. That is, the timing signal generated by the timing generator 926 controls the driving of the CMOS element 908, and image light from a subject is incident upon the CMOS element 908 while the CMOS element 908 is being driven. Accordingly, an electrical signal that is a basis for image data may be generated.

The CPU 928 may execute commands of a signal system for the CMOS element 908 or the amplifier-integrated CDS circuit 910 or execute commands of a manipulation system for the manipulation of the manipulator 932. In the exemplary embodiment of the present inventive concept, one CPU is provided. However, commands of the signal system and commands of the manipulation system can also be executed by another CPU.

The manipulator 932 may include members used to manipulate the image capture device 900 or implement various settings during a photographing operation. The members provided in the manipulator 932 may include a cross key (not illustrated) and a selection button (not illustrated) used to select a photographing mode or a photographing drive mode and set a soft focus effect. The shutter button 933 is used to execute a photographing operation. A subject is focused when the shutter button 933 is half pressed and is photographed when the shutter button 933 is fully pressed.

The memory 934 is an example of an image memory unit and may temporarily store a captured image or an image synthesized by an image synthesis unit 918. The memory 934 may have a storage capacity large enough to store a plurality of images. The reading and writing of an image from or to the memory 934 can be controlled by the image input controller 914. In addition, the transmission of data to the memory 934 may be accomplished using any one of the data interfaces 1 through 3 according to the exemplary embodiments of the present inventive concept.

The VRAM 936 maintains the content displayed on the LCD 924. The resolution of the LCD 924 or the maximum number of colors that can be expressed by the LCD 924 is dependent upon the capacity of the VRAM 936.

The recording media 940 is an example of an image recording unit and may record a captured image. The input and output of an image to or from the recording media 940 may be controlled by the media controller 938. The recording media 940 may use a memory card which is a card-type memory device that records data in a flash memory.

The motor drivers 942a, 942b and 942c may control the drivers 902a, 904a and 906a which operate the zoom lens 902, the aperture 904 and the focus lens 906, respectively. The size, amount of light, and pint of a subject can be adjusted by operating the zoom lens 902, the aperture 904 and the focus lens 906 using the motor drivers 942a, 942b and 942c.

The flash 944 may illuminate a subject when the subject is photographed outdoors at night or in a dark place. Specifically, the CPU 928 may send an emission command to the flash 944, and the flash 944 may emit light in response to the emission command from the CPU 928, thereby illuminating the subject.

Figure 15:
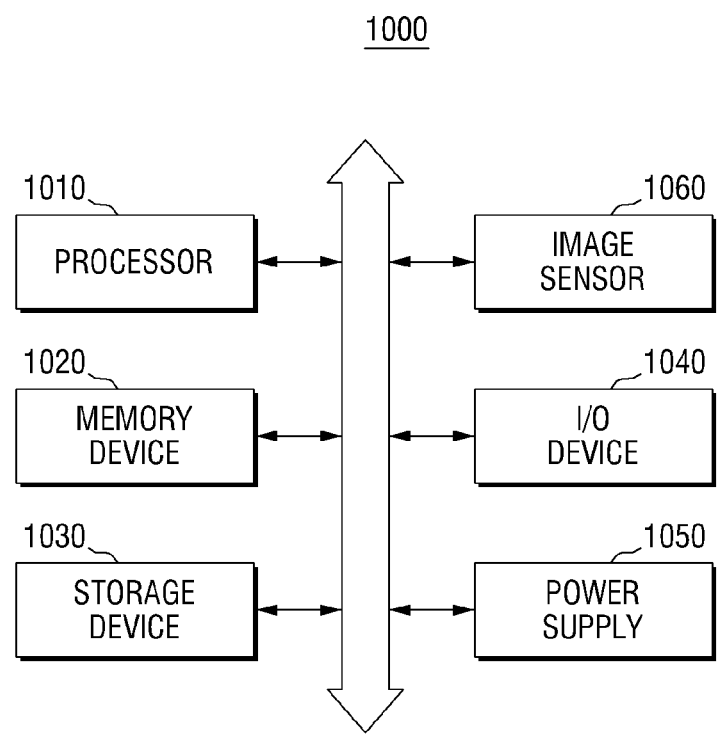
FIG. 15 is a block diagram of an example of a computing system using an image capture device according to exemplary embodiments of the present inventive concept.

FIG. 15 is a block diagram of an example of a computing system using an image capture device according to exemplary embodiments of the present inventive concept.

Referring to FIG. 15, a computing system 1000 may include a processor 1010, a memory device 1020, a storage device 1030, an input/output (I/O) device 1040, a power supply 1050, and an image sensor 1060.

The image sensor 1060 may be any one of the image sensors 11 and 811 according to the above-described exemplary embodiments of the present inventive concept.

Although illustrated in FIG. 15, the computing system 1000 may communicate with a video card, a sound card, a memory card, a USB device, or other electronic devices. A communication medium used here may be any one of the data interfaces 1 through 3 according to the exemplary embodiments of the present inventive concept.

The processor 1010 may perform particular calculations or tasks. Here, the processor 1010 may include any one of the ISPs 13, 813 and 916 according to the above-described exemplary embodiments of the present inventive concept. Depending on embodiment, the processor 1010 may be a microprocessor or a CPU.

The processor 1010 may communicate with the memory device 1020, the storage device 1030 and the I/O device 1040 through an address bus, a control bus, and a data bus. Depending on embodiment, the processor 1010 may be coupled to an extended bus such as a peripheral component interconnection (PCI) bus.

The memory device 1020 may store data required for the operation of the computing system 1000.

For example, the memory device 1020 may be implemented as a dynamic random access memory (DRAM), a mobile DRAM, a static random access memory (SRAM), a phase random access memory (PRAM), a ferroelectric random access memory (FRAM), a resistive random access memory (RRAM), and/or a magnetic random access memory (MRAM). The storage device 1030 may include a solid state drive (SSD), a hard disk drive (HDD), a CD-ROM, etc.

The I/O device 1040 may include an input device (e.g., a keyboard, a keypad, a mouse, etc.) and an output device (e.g., a printer, a display, etc.). The power supply 1050 may supply an operating voltage required for the operation of the computing system 1000.

The image sensor 1060 may be connected to and communicate with the processor 1010 via buses or other communication links. These communication media may be the data interfaces 1 through 3 according to the exemplary embodiments of the present inventive concept. The image sensor 1060 and the processor 1010 may be integrated together onto a single chip or may be integrated separately onto different chips, respectively.

The computing system 1000 may be any type of computing system using an image sensor. For example, the computing system 1000 may be a digital camera, a mobile phone, a personal digital assistant (PDA), a portable multimedia player (PMP), a smart phone, a tablet PC, etc.

In some exemplary embodiments of the present inventive concept, the computing system 1000 may be an Ultra Mobile PC (UMPC), a work station, a net-book, a portable computer, a wireless phone, a mobile phone, an e-book, a portable game console, a navigation device, a black box, a 3-dimensional television, a digital audio recorder, a digital audio player, a digital picture recorder, a digital picture player, a digital video recorder, a digital video player, etc.

Figure 16:
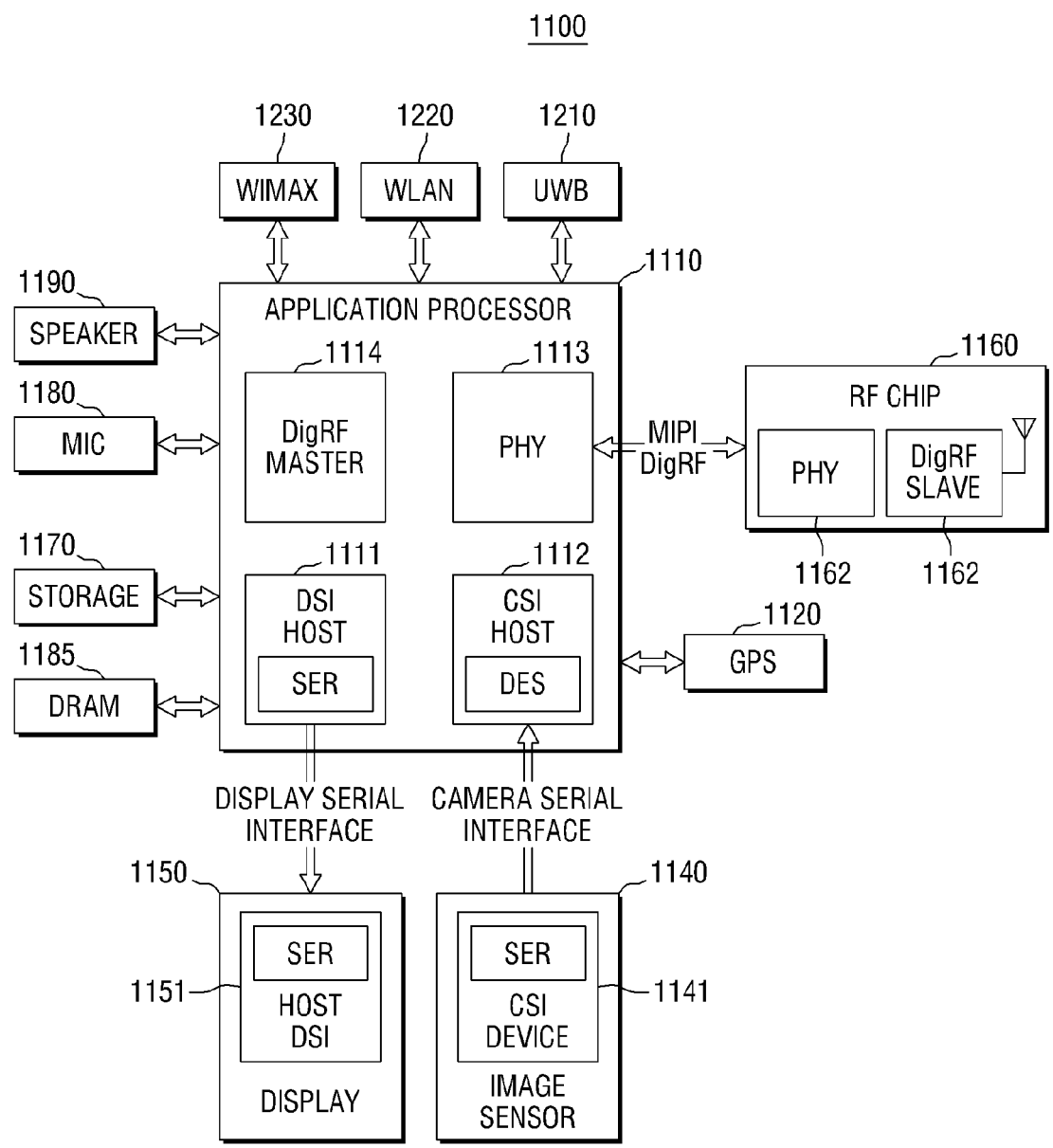
FIG. 16 is a block diagram of an example of interfaces used in the computing system of FIG. 15.

FIG. 16 is a block diagram of an example of interfaces used in the computing system 1000 of FIG. 15.

Referring to FIG. 16, a computing system 1100 may be implemented as a data processing device that can use or support a mobile industry processor interface (MIPI). The computing system 1100 may include an application processor 1110, an image sensor 1140 and a display 1150.

A camera serial interface (CSI) host 1112 of the application processor 1110 may perform serial communication with a CSI device 1141 of the image sensor 1140 via a CSI. The CSI may be any one of the data interfaces 1 through 3 according to the exemplary embodiments of the present inventive concept.

In some exemplary embodiments of the present inventive concept, the CSI host 1112 may include a deserializer DES, and the CSI device 1141 may include a serializer SER. A display serial interface (DSI) host 5111 of the application processor 1110 may perform serial communication with a DSI device 1151 of the display 1150 via a DSI. The DSI may be any one of the data interfaces 1 through 3 according to the exemplary embodiments of the present inventive concept.

In some exemplary embodiments of the present inventive concept, the DSI host 1111 may include a serializer SER, and the DSI device 1151 may include a deserializer DES. The computing system 1100 may further include a radio frequency (RF) chip 1160 which can communicate with the application processor 1110. A physical layer (PHY) 1113 of the computing system 1100 and a PHY 1161 of the RF chip 1160 may perform data transmission and reception according to MIPI DigRF. In addition, the PHY 1113 of the computing system 1100 and the PHY 1161 of the RF chip 1160 may perform data transmission and reception using the data interfaces 1 through 3 according to the exemplary embodiments of the present inventive concept.

The application processor 1110 may further include a DigRF MASTER 1114 which controls the data transmission and reception of the PHY 1161 based on the MIPI DigRF. The computing system 1100 may further include a global positioning system (GPS) 1120, a storage 1170, a microphone 1180, a DRAM 1185, and a speaker 1190. In addition, the computing system 1100 may perform communications using an ultra wideband (UWB) 1120, a wireless local area network (WLAN) 1220, a worldwide interoperability for microwave access (WIMAX) 1230, etc. However, the above structure and interfaces of the computing system 1100 are merely an example, and the present inventive concept is not limited to this example.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims. It is therefore desired that the present exemplary embodiments be considered in all respects as illustrative and not restrictive, reference being made to the appended claims rather than the foregoing description to indicate the scope of the inventive concept.

What is claimed is:

1. A data interface comprising:
   a first sampler configured to sample a first bitset having a first bit which is included in a first image data and a third bit which is included in a second image data;
   a second sampler, physically separated from the first sampler, and configured to sample a second bitset having a second bit which is included in the first image data and is a higher-order bit than the first bit and a fourth bit which is included in the second image data and is a higher-order bit than the third bit;
   a clock generator configured to adjust a sampling timing of the first bitset and second bitset based on a multi-phase clock; and
   a clock data recovery (CDR) circuit shared by the first sampler and the second sampler, and configured to output the multi-phase clock to the clock generator based on input received based on sampling by at least one of the first sampler and the second sampler,
   wherein the first sampler receives the first bitset, the second sampler receives the second bitset, and the first bitset and second bitset are separate when sent for receipt to the first sampler and second sampler, respectively.

2. The data interface of claim 1, further comprising:
   a first deserializer and a second deserializer configured to convert the sampled first bitset and the sampled second bitset into a parallelized first bitset and a parallelized second bitset respectively.

3. The data interface of claim 2, further comprising:
   a synchronizer connected between the second deserializer and the CDR circuit and configured to adjust a skew of an output of the second deserializer based on feedback of the CDR circuit.

4. The data interface of claim 1,
   wherein each of the first image data and second image data comprises N bits, wherein the first bitset comprises N/2 lower bits of each of the first image data and second image data, and the second bitset comprises N/2 upper bits of each of the first image data and second image data, where N is an even number.

5. The data interface of claim 2, further comprising:
   a third sampler configured to sample a third bitset having a fifth bit which is included in the first image data and located between the first bit and the second bit and a sixth bit which is included in the second image data and located between the third bit and the fourth bit.

6. The data interface of claim 5, further comprising:
   a third deserializer configured to convert the sampled third bitset into a parallelized third bitset.

7. The data interface of claim 6, further comprising:
   a synchronizer connected between the third deserializer and the CDR circuit and configured to adjust a skew of an output of the third deserializer based on a feedback of the CDR circuit.

8. The data interface of claim 1,
   wherein a bit transition of the first bitset is greater than a bit transition of the second bitset.

9. A data interface, comprising:
a formatter configured to generate a first bitset having a first bit which is included in a first image data and a third bit which is included in a second image data and a second bitset having a second bit which is included in the first image data and is a higher-order bit than the first bit and a fourth bit which is included in the second image data and is a higher-order bit than the third bit;
a first serializer configured to serialize the first bitset;
a second serializer configured to serialize the second bitset;
a first output driver configured to convert the serialized first bitset into a first differential signal;
a second output driver configured to convert the serialized second bitset into a second differential signal; and
a clock generator configured to provide a plurality of clock signals to the formatter, the first serializer and second serializer, and the first output driver and second output driver.

10. The data interface of claim 9,
wherein the first differential signal is transmitted to a high density (HD) channel and the second differential signal is transmitted to a low density (LD) channel.

11. The data interface of claim 9, further comprising:
a pre-logic configured to convert the first bitset or second bitset received from the formatter into a bitset comprising one or more transitions when the first bitset or second bitset comprises no transition.

12. The data interface of claim 9,
wherein each of the first image data and second image data comprises N bits, wherein the first bitset comprises N/2 lower bits of each of the first image data and second image data, and the second bitset comprises N/2 upper bits of each of the first image data and second image data, where N is an even number.

13. The data interface of claim 9,
wherein the formatter generates a third bitset having a fifth bit which is included in the first image data and located between the first bit and the second bit and a sixth bit which is included in the second image data and located between the third bit and the fourth bit.

14. The data interface of claim 9, the formatter comprising:
a plurality of toggle counters configured to count a number of transitions in upper bits and lower bits of the first image data and the second image data;
a comparator configured to compare the number of transitions of upper bits and lower bits of the first image data and the second image data;
a plurality of multiplexers configured to assign higher transitional bits among the upper bits and the lower bits to the first bitset and assign lower transitional bits among the upper bits and the lower bits to the second bitset; and
a dummy bit generator configured to generate a dummy bit indicating whether the first bitset or the second bitset is a least-significant-bit (LSB) bitset or a most-significant-bit (MSB) bitset.

15. The data interface of claim 14,
wherein the first bitset and the second bitset further include a first dummy bit and a second dummy bit respectively generated by the dummy bit generator.

16. A data transmission method, comprising:
receiving, through a first channel, a first bitset comprising a first bit which is included in a first image data and a third bit which is included in a second image data;
receiving, through a second channel separate from the first channel, a second bitset comprising a second bit which is included in the first image data and is a higher-order bit than the first bit, and a fourth bit which is included in the second image data and is a higher-order bit than the third bit;
sampling the first bitset and second bitset based on a clock input provided by a clock generator; and
adjusting the sampling timing of each of the first bitset and second bitset by adjusting a multi-phase clock signal provided by a clock data recovery (CDR) circuit based on input received based on sampling at least one of the first bitset and the second bitset,
wherein the first bitset and second bitset are separate when sent through the first channel and second channel.

17. The data transmission method of claim 16, further comprising:
generating the first bitset and the second bitset;
serializing the first bitset and the second bitset; and
converting the serialized first bitset and the serialized second bitset into a first differential signal and a second differential signal.

18. The data transmission method of claim 17, further comprising:
transmitting the first differential signal through a high density (HD) channel; and
transmitting the second differential signal through a low density (LD) channel.

19. The data transmission method of claim 18,
wherein a bit transition of the first differential signal is greater than a bit transition of the second differential signal.

20. The data transmission method of claim 17, further comprising:
counting a number of transitions in upper bits and lower bits of the first image data and the second image data;
comparing the number of transitions of upper bits and lower bits of the first image data and the second image data;
assigning higher transitional bits among the upper bits and the lower bits to the first bitset and assigning lower transitional bits among the upper bits and the lower bits to the second bitset; and
generating a dummy bit indicating whether the first bitset or the second bitset is a least-significant-bit (LSB) bitset or a most-significant-bit (MSB) bitset.

* * * * *